H. E. CHANDLER.
KNIFE.
APPLICATION FILED JULY 23, 1910.
991,953.
Patented May 9, 1911.
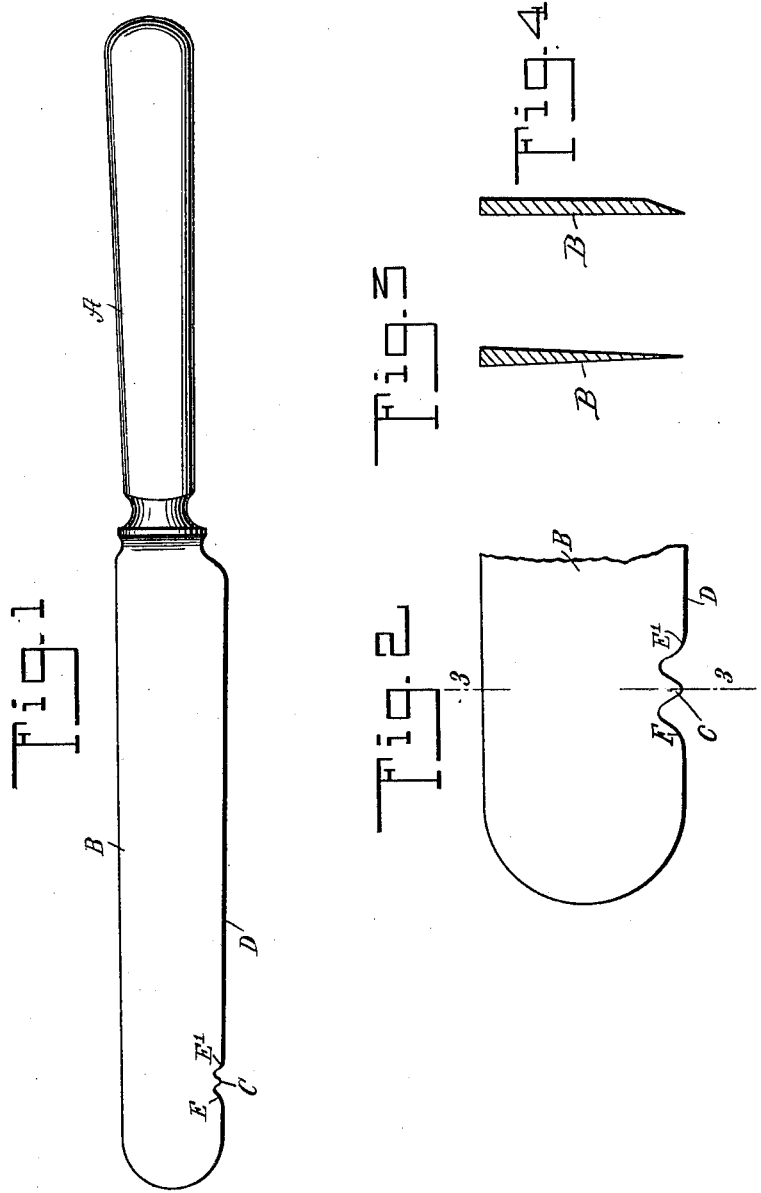
WITNESSES:
INVENTOR
Henry E. Chandler
BY
ATTORNEYS

UNITED STATES PATENT OFFICE.

HENRY E. CHANDLER, OF NEW YORK, N. Y.

KNIFE.

991,953.	Specification of Letters Patent.	Patented May 9, 1911.

Application filed July 23, 1910. Serial No. 573,549.

*To all whom it may concern:*

Be it known that I, HENRY E. CHANDLER, a citizen of the United States, and a resident of the city of New York, borough of Manhattan, in the county and State of New York, have invented a new and Improved Knife, of which the following is a full, clear, and exact description.

The invention relates to cutlery, and its object is to provide a new and improved knife, designed for cutting steaks, chops and other kinds of meat product or other food stuffs, whether raw or cooked, for scaling fish, for separating the flesh of poultry from the bones, for separating the small joints and ligaments of poultry, and for other purposes, and arranged in such a manner that the use of the knife requires very little physical exertion on the part of the user to properly and quickly accomplish the desired result. For the purpose mentioned use is made of a tooth integral with the knife blade at the forward end thereof and extending in the plane of the blade, the tooth having its point arranged within the straight cutting edge of the blade, the cutting edge being interrupted for a short distance on both sides of the tooth.

A practical embodiment of the invention is represented in the accompanying drawings forming a part of this specification, in which similar characters of reference indicate corresponding parts in all the views.

Figure 1 is a side elevation of the knife in the form of an ordinary table knife; Fig. 2 is an enlarged side elevation of the forward end of the knife blade; Fig. 3 is a cross section of the same on the line 3—3 of Fig. 1; and Fig. 4 is a like view of a modified form of the same.

The knife illustrated in Fig. 1 is in the form of an ordinary table knife, but it is expressly understood that my invention is not limited to this particular form of knife as the improvement may be applied to the blades of dessert knives, carving knives and other forms of table or kitchen knives. The knife consists of a handle A and a blade B having a tooth C arranged integrally near the forward end of the blade, the tooth extending with its faces in the same plane as the faces of the blades, and the apex of the tooth ranging within the cutting edge D of the blade, the cutting edge being cut out or interrupted for a short distance on both sides of the tooth C, as plainly indicated at E, E' in Figs. 1 and 2.

The operator in using the knife draws the cutting edge D forward and backward over the meat or other product to be cut and slightly bears on the knife so that the meat under the cutting edge D passes into the cut-out portions E, E' and is then engaged and cut by the forward and backward edge of the tooth and the walls of the cut-out portions E, E'. The cutting edge D of the tooth C may be beveled, on both faces, or on only one, in the fashion of a chisel.

It is understood that the difficulty in cutting animal flesh, whether raw or cooked, is that considerable pressure is needed even with a knife having a keen edge, owing to the adhesive quality of the mass; the sharpened edge is retarded by the clogging of the mass against the knife above the cutting edge. The ordinary knife presents only one cutting edge while the knife above described presents three, and the usual pressure on an ordinary table knife has but small penetrative force, whereas the same pressure exerted with the improved knife makes a deeper incision. In the improved knife the clogging, after the ordinary incision is made, is met by the forward edge of the tooth and separated, and from the angle at which a knife is usually held the portion that is not separated by the forward edge is taken up by the forward edge of the knife proper beyond the tooth, it being understood that the same operation takes places on the reverse or backward stroke of the knife.

In scaling a fish, the tooth C readily passes under the scales and dislodges the same either on the forward or backward stroke of the knife, and the tooth is also very serviceable in separating the flesh of poultry from the bones or when separating the small joints and ligaments of poultry after the same has been cooked and served. It will also be noticed that the arrangement permits a plated knife to be used in polite service where now a common steel knife is used.

Having thus described my invention, I claim as new and desire to secure by Letters Patent:

1. As an article of manufacture, a knife comprising a blade and a handle, the blade having an integral tooth near the end remote from the handle, and in the plane of the blade, the cutting edge of the blade being on both sides of the tooth and extending beyond the apex thereof, the said cutting edge being interrupted on each side of the blade and the edge of the tooth and the edge of the interrupted portions being beveled to form a cutting edge.

2. As an article of manufacture, a knife comprising a blade and a handle, the blade having a tooth near the end remote from the handle, the blade having a cutting edge on each side of the tooth and extending beyond the apex thereof, the said cutting edge being interrupted on each side of the blade, and the edge of the tooth and the edge of the interrupted portions being beveled to form a cutting edge.

In testimony whereof I have signed my name to this specification in the presence of two subscribing witnesses.

HENRY E. CHANDLER.

Witnesses:
 THOS. G. HOSTER,
 PHILIP D. ROLLHAUS.

Copies of this patent may be obtained for five cents each, by addressing the "Commissioner of Patents, Washington, D. C."